US010203483B2

(12) United States Patent
Huddleston

(10) Patent No.: US 10,203,483 B2
(45) Date of Patent: Feb. 12, 2019

(54) LWIR IMAGING LENS, IMAGE CAPTURING SYSTEM HAVING THE SAME, AND ASSOCIATED METHOD

(71) Applicant: FLIR Systems Trading Belgium BVBA, Meer (BE)

(72) Inventor: Jeremy Huddleston, Oviedo, FL (US)

(73) Assignee: FLIR SYSTEMS TRADING BELGIUM BVBA, Meer (BE)

(*) Notice: Subject to any disclaimer, the term of this patent is extended or adjusted under 35 U.S.C. 154(b) by 99 days.

(21) Appl. No.: 15/170,623

(22) Filed: Jun. 1, 2016

(65) Prior Publication Data
US 2016/0334604 A1 Nov. 17, 2016

Related U.S. Application Data

(63) Continuation of application No. 13/835,188, filed on Mar. 15, 2013, which is a continuation-in-part of (Continued)

(51) Int. Cl.
G02B 13/00 (2006.01)
G02B 9/06 (2006.01)
G02B 13/14 (2006.01)

(52) U.S. Cl.
CPC ............ G02B 13/008 (2013.01); G02B 9/06 (2013.01); G02B 13/003 (2013.01); G02B 13/14 (2013.01); G02B 13/146 (2013.01)

(58) Field of Classification Search
CPC .. G02B 13/14; G02B 13/146; G02B 27/4211; G02B 13/008; G02B 9/06; G02B 13/003
(Continued)

(56) References Cited

U.S. PATENT DOCUMENTS 3,160,700 A 12/1964 Snyder
4,419,182 A 12/1983 Westerberg et al.
(Continued)

FOREIGN PATENT DOCUMENTS

CN 1576941 A 2/2005
CN 101387737 A 3/2009
(Continued)

OTHER PUBLICATIONS

Office Action issued for U.S. Appl. No. 15/161,791 dated Mar. 9, 2017.
(Continued)

Primary Examiner — Zachary W Wilkes
Assistant Examiner — George G King
(74) Attorney, Agent, or Firm — Lee & Morse, P.C.

(57) ABSTRACT

An imaging lens for use with an operational waveband over any subset of 7.5-13.5 μm may include a first optical element of a first high-index material and a second optical element of a second high-index material, that may have a refractive index greater than 2.2 in the operational waveband, an absorption per mm of less than 75% in the operational waveband, and an absorption per mm of greater than 75% in a visible waveband of 400-650 nm. Optically powered surfaces of the imaging lens may include a sag across their respective clear apertures that are less than 10% of a largest clear aperture of the imaging lens. Respective maximum peak to peak thicknesses of the first and second optical elements may be similar in size, for example within 15 percent of each other. Ratios of maximum peak to peak thickness to clear aperture and, separately, to sag are also provided.

6 Claims, 9 Drawing Sheets

Related U.S. Application Data application No. 13/356,211, filed on Jan. 23, 2012, now Pat. No. 9,348,120.

(58) Field of Classification Search
USPC .......................................................... 359/356
See application file for complete search history.

(56) References Cited

U.S. PATENT DOCUMENTS

| | | | |
|---|---|---|---|
| 4,482,443 | A | 11/1984 | Bacon et al. |
| 4,537,464 | A | 8/1985 | Boutellier |
| 4,827,130 | A | 5/1989 | Reno |
| 6,535,332 | B1 | 3/2003 | Nakano et al. |
| 6,999,243 | B2 | 2/2006 | Chipper |
| 7,863,570 | B2 | 1/2011 | Myers et al. |
| 8,044,355 | B2 | 10/2011 | Gibbons et al. |
| 9,348,120 | B2 | 5/2016 | Huddleston |
| 2002/0148560 | A1 | 10/2002 | Carr |
| 2003/0117482 | A1 | 6/2003 | Border et al. |
| 2004/0218284 | A1 | 11/2004 | Chen et al. |
| 2005/0018314 | A1 | 1/2005 | Yamaguchi et al. |
| 2006/0016995 | A1 | 1/2006 | Kummer et al. |
| 2009/0067041 | A1* | 3/2009 | Izumi ................... G02B 13/14 359/356 |
| 2009/0224156 | A1 | 9/2009 | Gibbons et al. |
| 2012/0113504 | A1 | 5/2012 | Tanami et al. |
| 2012/0176668 | A1 | 7/2012 | Saito et al. |
| 2012/0188635 | A1 | 7/2012 | Kubala et al. |
| 2012/0229892 | A1 | 9/2012 | Kang et al. |
| 2013/0076900 | A1 | 3/2013 | Mrozek et al. |
| 2013/0083200 | A1* | 4/2013 | Saito .................... G02B 13/14 348/164 |
| 2013/0208353 | A1 | 8/2013 | Huddleston |
| 2013/0293970 | A1 | 11/2013 | Qiu et al. |

FOREIGN PATENT DOCUMENTS

| | | |
|---|---|---|
| CN | 102466861 A | 5/2012 |
| EP | 1077386 A1 | 2/2001 |
| EP | 2034344 A2 | 3/2009 |
| EP | 2034344 A3 | 3/2009 |
| JP | 2005-077556 A | 3/2005 |
| WO | WO 2012/100405 A1 | 8/2012 |

OTHER PUBLICATIONS

George Curatu, Design and fabrication of low-cost thermal imaging optics using precision chalcogenide glass molding, SPIE Proceedings, vol. 7060, Aug. 29, 2007.
Chinese Office action dated Mar. 11, 2016 for CN 2013800153157; Huddleston.
PCT International Search Report dated Jan. 22, 2013.
Edmund Optics "Understanding Optical Specifications" https://www.edmundoptics.comIresources/applicationnotes/ optics/understanding-optical-specifications/ printed Jun. 2017.
Office Action issued for U.S. Appl. No. 14/589,305 dated Jul. 14, 2017.
Thurber, et al. "Semiconductor Measurement Technology: The Relationship Between Resistivity and Dopant Density for Phosphorus and Boron-Doped Silicon", 1981.
Office Action issued for U.S. Appl. No. 14/589,305 dated Dec. 22, 2017.

* cited by examiner

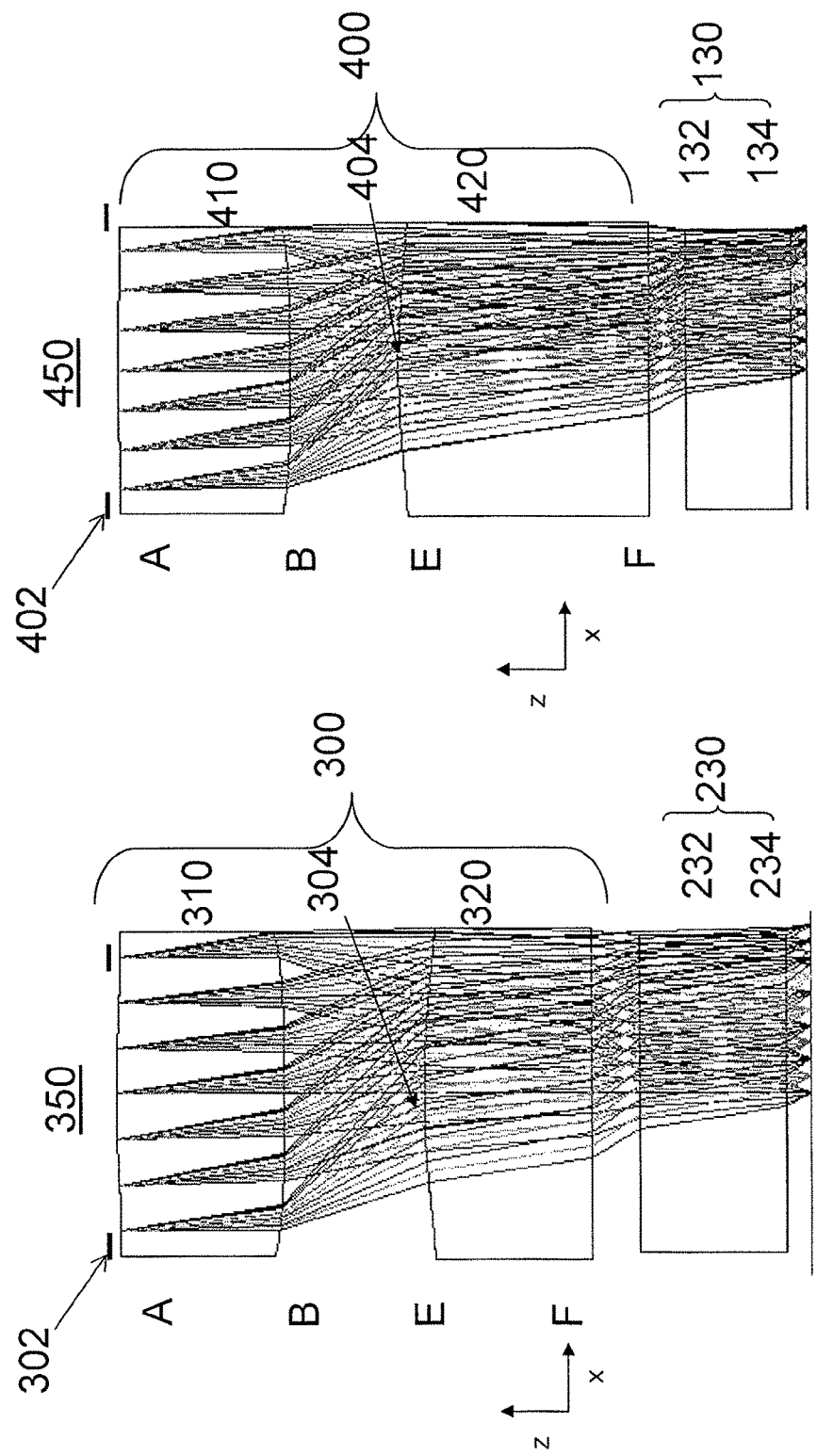

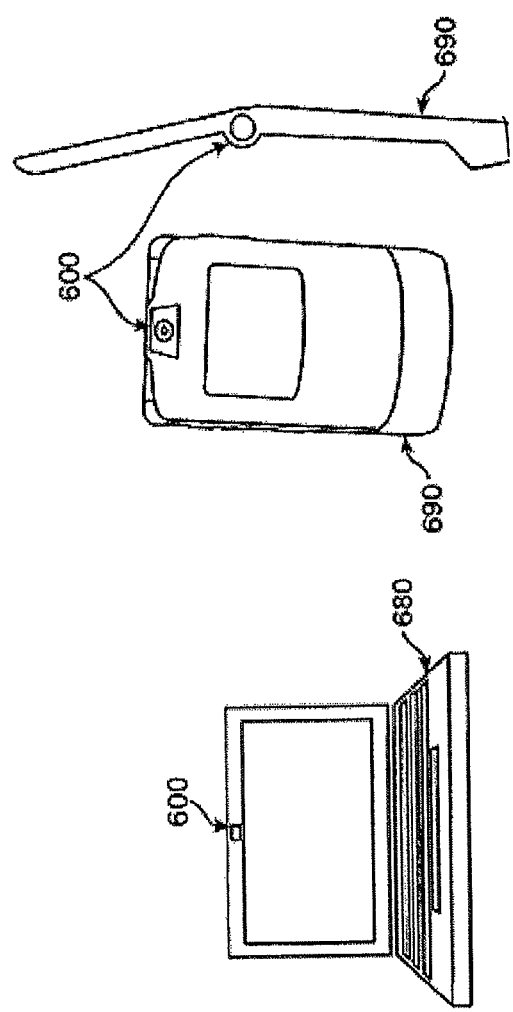

LWIR IMAGING LENS, IMAGE CAPTURING SYSTEM HAVING THE SAME, AND ASSOCIATED METHOD

CROSS-REFERENCE TO RELATED APPLICATION

This application is a Continuation of U.S. patent application Ser. No. 13/835,188 filed Mar. 15, 2013, pending, which is a Continuation-In-Part of application of U.S. patent application Ser. No. 13/356,211 filed Jan. 23, 2012, now U.S. Pat. No. 9,348,120 B2, and entitled "LWIR Imaging Lens, Image Capturing System Having the Same, and Associated Methods."

BACKGROUND OF THE INVENTION

1. Field of the Invention

Embodiments relate to an imaging lens for the long wavelength infrared (LWIR) region, an image capturing system including the same, and associated methods.

2. Description of the Related Art

As with most technology, there is a demand for smaller and cheaper thermal imagers, whether as stand alone devices or integrated into mobile devices, electronic device, and so forth.

SUMMARY OF THE INVENTION

Embodiments are directed to an imaging lens for use with an operational waveband over any subset of 7.5-13.5 µm (micron or micrometer). The imaging lens may include a first optical element of a first high-index material, the first optical element having a front surface and a rear surface and a second optical element of a second high-index material, the second optical element having a front surface and a rear surface, the front surface of the second optical element facing the rear surface of the first optical element. At least two surfaces of the first and second optical elements may be optically powered surfaces. A largest clear aperture of all optically powered surfaces may not exceed a diameter of an image circle of the imaging lens corresponding to a field of view of 55 degrees or greater by more than 30%. The first and second high-index materials may have a refractive index greater than 2.2 in the operational waveband, an absorption per mm of thickness less than 75% in the operational waveband, and an absorption per mm of thickness greater than 75% in a visible waveband of 400-650 nm.

The first and second high-index materials may be identical.

At least one of the first and second high-index materials may be silicon.

The largest clear aperture does not exceed the diameter of the image circle by more than 20%.

Three surfaces of the first and second optical elements may be optically powered surfaces.

The optically powered surfaces may be the front and rear surfaces of the first optical element and the front surface of the second optical element.

All three of the optically powered surfaces may be aspheric.

Each optically powered surface may have a positive power at an apex thereof.

Each optically powered surface may have a maximum sag height difference across the clear aperture of less than 100 µm.

Each optically powered surface may have a maximum sag height difference across the clear aperture of 50 µm or less.

One, two, or three of the optically powered surfaces may be aspheric.

The F-number of the imaging lens may be less than 1.1.

The imaging lens may include an optical stop at the front surface of the first lens element.

The optical stop may be effectively in contact with the front surface of the first lens element.

The optical stop may include a metal, e.g., chromium, aperture effectively in contact with the front surface of the first lens element.

The metal aperture may have a thickness of less than 200 nm.

Transmission through the optical stop may be less than 0.5% in the operational waveband.

The optical stop may be adhered to the front surface of the first optical element.

Center thicknesses of the first and second optical elements may be within 15% of one another.

A center thickness of each of the first and second optical elements is greater than 500 µm and less than 1500 µm, e.g., greater than 500 µm and less than 1000 µm.

The imaging lens may include a spacer between and adhered to the first and second optical elements.

The imaging lens may include a first flat region on the rear surface of the first optical element and a second flat region on the front surface of the second optical element, wherein the spacer is adhered to the first and second optical elements at the first and second flat regions.

The imaging lens may include a diffractive optical element on the front surface of the first optical element, the rear surface of the first optical element, the front surface of the second optical element, and/or the rear surface of the second optical element.

The diffractive optical element may be on an optically powered surface having the greatest power.

Embodiments are directed to an imaging system for use with an operational waveband over any subset of 7.5-13.5 µm. The imaging system may include a sensor for use with an operational waveband over any subset of 7.5-13.5 µm and an imaging lens imaging the operational waveband onto the sensor. The imaging lens may include a first optical element of a first high-index material, the first optical element having a front surface and a rear surface and a second optical element a second high-index material, the second optical element having a front surface and a rear surface, the front surface of the second optical element facing the rear surface of the first optical element. At least two surfaces of the first and second optical elements may be optically powered surfaces. A maximum clear aperture of all optically powered surfaces may not exceed an image diagonal of the sensor by more than 30%. The first and second high-index materials may have a refractive index greater than 2.2 in the operational waveband, an absorption per mm of thickness less than 75% in the operational waveband, and an absorption per mm of thickness greater than 75% in a visible waveband of 400-650 nm.

A ratio of an optical track length of the imaging system to an image diagonal of the sensor may be less than 2.5.

The sensor may include a cover glass of a third high-index material having a refractive index greater than 2.2 in the operational band.

The third high index material and at least one of the first and second high index materials may be identical.

The third high index material may be silicon.

The cover glass has a thickness greater than 0.5 mm and less than 1.0 mm.

A distance between an apex of the rear surface of the first optical element and an apex of the front surface of the second optical element may be less than 50% greater than a distance between an apex of the rear surface of the second optical element and the cover glass.

A distance between an apex of the rear surface of the first optical element and an apex of the front surface of the second optical element may be greater than 50% larger than a distance between an apex the rear surface of the second optical element and the cover glass.

The imaging system may include an adjustment mechanism for altering a distance between the imaging lens and the sensor.

The adjustment mechanism may include a threaded barrel assembly housing the imaging lens.

Embodiments are directed to an electronic device including an imaging system for use with an operational waveband over any subset of 7.5-13.5 µm.

Embodiments are directed to an imaging lens for use with an operational waveband over any subset of 7.5-13.5 µm. The imaging lens may include a first optical element of a first high-index material, the first optical element having a front surface and a rear surface, an first optically powered surface on one of the front and rear surfaces of the first optical element, and a second optical element of a second high-index material, the second optical element having a front surface and a rear surface, the front surface of the second optical element facing the rear surface of the first optical element, a second optically powered surface on one of the front and rear surfaces of the second optical element. The first and second high-index materials have a refractive index greater than 2.2 in the operational waveband, an absorption per mm of thickness less than 75% in the operational waveband, and an absorption per mm of thickness greater than 75% in a visible waveband of 400-650 nm.

The first optically powered surface may be on the front surface of the first optical element and the second optically powered surface may be on the rear surface of the second optical element.

The rear surface of the first optical element and the front surface of the second optical element may have negligible optical power therein.

Embodiments are directed to an imaging lens for use with an operational waveband over any subset of 7.5-13.5 µm. The imaging lens may include a first silicon optical element, the first silicon optical element having a front surface and a rear surface; and a second silicon optical element, the second silicon optical element having a front surface and a rear surface, the front surface of the second silicon optical element facing the rear surface of the first silicon optical element. At least two surfaces of the first and second optical elements may be etched optically powered surfaces.

Embodiments are directed to an imaging lens for use with an operational waveband over any subset of 7.5-13.5 µm, the imaging lens comprising a first optical element of a first high-index material, the first optical element with an object side surface and an image side surface. The imaging lens includes a second optical element of a second high-index material, and may include an object side surface and an image side surface. The object side surface of the second optical element faces the image side surface of the first optical element. At least one of the object side and the image side surfaces of each of the first and second optical elements are optically powered surfaces. Further, each optically powered surface includes a sag across its respective clear aperture that is less than 10% of a largest clear aperture of the imaging lens. The first and second high-index materials may have a refractive index greater than 2.2 in the operational waveband, an absorption per mm of thickness less than 75% in the operational waveband, and an absorption per mm of thickness greater than 75% in a visible waveband of 400-650 nm.

The first and second high-index materials may be the same. At least one of the first and second high-index materials may be silicon. The object side surface of the second optical element may be optically powered and include the largest clear aperture. In another embodiment, the image side surface of the second optical element is optically powered and includes the largest clear aperture. The second optical element may include a plano-convex shape. Respective maximum peak to peak thickness of the first and second optical elements may be within 15 percent of each other. The first optical element and the second optical element may each have positive refractive power.

Embodiments are directed to an imaging lens for use with an operational waveband over any subset of 7.5-13.5 µm, the imaging lens comprising a first optical element of a first high-index material and including an object side surface and an image side surface. The imaging lens includes a second optical element of a second high-index material and also includes an object side surface and an image side surface, where the object side surface of the second optical element faces the image side surface of the first optical element. Respective first and second maximum peak to peak thicknesses of the first and second optical elements may be within 15 percent of each other. The first and second high-index materials may have a refractive index greater than 2.2 in the operational waveband, an absorption per mm of thickness less than 75% in the operational waveband, and an absorption per mm of thickness greater than 75% in a visible waveband of 400-650 nm.

The first optical element may include a meniscus shape, with the object side surface of the first optical element being convex and the image side surface of the first optical element being concave. In another embodiment, the object side surface and image side surface of the first optical element are each convex near the optical axis. The second optical element may be plano-convex. Respective maximum peak to peak thicknesses of the first and second optical elements may be within 3 percent of each other and may be greater than 500 microns and less than 1500 microns. The first and second high-index materials may be silicon.

Embodiments are directed to an imaging lens for use with an operational waveband over any subset of 7.5-13.5 µm, the imaging lens comprising a first optical element of a high-index material having a refractive index greater than 2.2 in the operational waveband. The first optical element may include a meniscus shape with a convex object side surface and a concave image side surface. The first optical element may have positive refractive power. The imaging lens further comprises a second optical element of the high-index material. The second optical element may have a plano-convex shape and positive refractive power.

The F-number of the imaging lens may be less than 1.4. The object side surface and image side surface of the first optical element and a powered, non-planar surface of the second optical element may be aspheric. Respective maximum peak to peak thickness of the first and second optical elements may be within 15 percent of each other. Each optically powered surface of the imaging lens may include a sag across its respective clear aperture that is less than 10% of a largest clear aperture of the imaging lens.

Embodiments are directed to an imaging lens for use with an operational waveband over any subset of 7.5-13.5 µm, the imaging lens comprising a first optical element of a first high-index material and including an object side surface and an image side surface. The imaging lens includes a second optical element of a second high-index material and also includes an object side surface and an image side surface, where the object side surface of the second optical element faces the image side surface of the first optical element. At least one of the object side and the image side surfaces of each of the first and second optical elements may be optically powered surfaces. Each optically powered surface may have a sag across a respective clear aperture and the sag of each powered surface of the imaging lens may be less than 30% of an overall maximum peak to peak thickness of the optical element on which that powered surface lies. In some embodiments, the sag of each powered surface of the imaging lens may be less than 20% of the overall maximum peak to peak thickness of the optical element on which that powered surface lies. The first and second high-index materials may have a refractive index greater than 2.2 in the operational waveband, an absorption per mm of thickness less than 75% in the operational waveband, and an absorption per mm of thickness greater than 75% in a visible waveband of 400-650 nm.

Embodiments are directed to an imaging lens for use with an operational waveband over any subset of 7.5-13.5 µm, the imaging lens comprising a first optical element of a first high-index material and including an object side surface and an image side surface. The imaging lens includes a second optical element of a second high-index material and also includes an object side surface and an image side surface, where the object side surface of the second optical element faces the image side surface of the first optical element. At least one of the object side and the image side surfaces of each of the first and second optical elements may be optically powered surfaces with a respective clear aperture and an overall maximum peak to peak thickness of each optical element may be less than 50% of the clear aperture of optically powered surfaces on those optical elements. In some embodiments, the overall maximum peak to peak thickness of each optical element is less than 35% of the clear aperture of optically powered surfaces on those optical elements. The first and second high-index materials may have a refractive index greater than 2.2 in the operational waveband, an absorption per mm of thickness less than 75% in the operational waveband, and an absorption per mm of thickness greater than 75% in a visible waveband of 400-650 nm.

BRIEF DESCRIPTION OF THE DRAWINGS

The above and other features and advantages will become more apparent to those of ordinary skill in the art by describing in detail exemplary embodiments with reference to the attached drawings, in which:

FIG. 4 illustrates a schematic side view of an image capturing system in accordance with an embodiment;

FIG. 5 illustrates a schematic side view of an image capturing system in accordance with an embodiment;

FIG. 7 illustrates a schematic perspective view of a computer incorporating an image capturing device in accordance with embodiments;

FIG. 8 illustrates a schematic perspective view of a mobile device incorporating an image capturing device in accordance with embodiments;

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete.

In designing long wavelength infrared (LWIR) sensors, also known as thermal imagers, materials for use as thermal lenses typically have high transmission in the LWIR waveband of 7.5-13.5 µm. Current typical materials for thermal lenses include germanium (Ge), chalcogenide glass, zinc selenide (ZnSe), and zinc sulfide (ZnS). However, many optical materials having other desirable properties are excluded due to a high absorption in the LWIR waveband of 7.5-13.5 µm.

As described in detail below, as designs for LWIR sensors shrink, e.g., for use in mobile devices, a thickness of material used for thermal lenses may decrease sufficiently to allow materials that are typically considered too absorptive in the LWIR waveband to be used as thermal lenses. This allows the use of other materials, e.g., silicon, that have a strong absorption band in the LWIR waveband, but offer other advantages, e.g., manufacturability, low coefficient of thermal expansion, low dispersion, etc., to be employed.

The imaging lenses discussed in detail below are to be operational over any subset of the LWIR waveband. These imaging lenses are designed to be made in a high index material, i.e., greater than 2.2, having an absorption per mm of thickness less than 75% in the operational waveband, and an absorption per mm of thickness greater than 75% in a visible waveband of 400-650 nm. While silicon meets these parameters and provides advantages noted above, other materials that meet these parameters may also be used.

Figure 1:
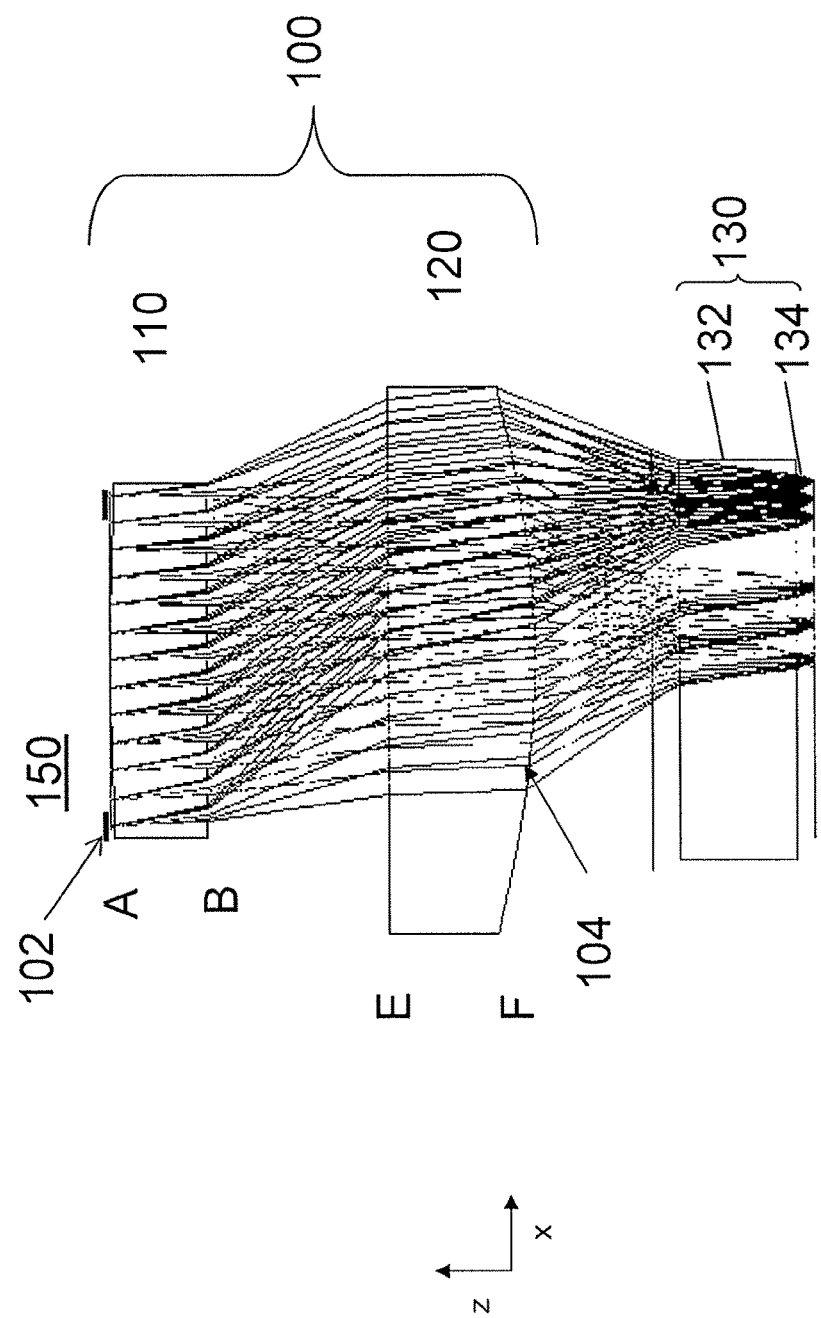
FIG. 1 illustrates a schematic side view of an imaging capturing system in accordance with an embodiment.

FIG. 1 illustrates a schematic side view of an image capturing system 150 in the LWIR waveband in accordance with an embodiment. As illustrated in FIG. 1, the image capturing system 150 includes an imaging lens 100 and a sensor 130.

The imaging lens 100 may include a first optical element 110 and a second optical element 120. In the schematic illustration of FIG. 1, a spacer (which would include surfaces C and D, see FIG. 6) between the first optical element 110 and the second optical element 120 has been omitted for clarity.

In this particular embodiment, both the first optical element 110 and the second optical element 120 are planoconvex lenses. A surface A, here an input surface of the imaging lens 100, of the first optical element 110 and a surface F, here a final surface of the imaging lens 100, both have optical power. One or both of these surfaces may be aspheric. Surface B of the first optical element 110 and surface E of the second optical element 120 have no optical power, here are both planar, and face each other.

The imaging lens 100 may also include an aperture stop 102. For example, the aperture stop 102 may be adjacent surface A, e.g., directly on surface A, of the first optical element 110. The aperture stop 102 may be made of metal, e.g., chromium, a dyed polymer, or any suitable material that is opaque to LWIR. The aperture stop 102 may be at any appropriate location within the imaging lens 100. The aperture stop 102 may be thin, e.g., have a thickness of less than 200 nm, but thick enough to be effective, i.e., have a transmission therethrough of less than about 0.5% in the operational waveband. The f-number for the imaging lens 100 may be less than 1.1.

If the material used for one or both optical elements 110, 120 presents chromatic dispersion over an operational waveband or if the imaging lens 100 otherwise requires correction, a diffractive element 104 may be provided on one or more of the surfaces A, B, E, or F. For example, the diffractive element 104 may be on the surface having the most optical power, here, surface F.

The sensor 130 may include a sensor cover glass 132 and pixels in a sensor image plane 134, the pixels detecting LWIR radiation. The sensor cover glass 132 may be made of silicon and may have a thickness between 0.5 mm and 1.0 mm. The working distance of the image capturing system 150 is a distance from a bottom surface, i.e., an apex of the bottom surface, of the imaging lens 100, here surface F, to a top surface of the cover glass 132. The optical track length of the imaging capturing system 150 is a distance from an apex of the first surface of the imaging lens 100, here surface A, to the sensor image plane 134.

While the above embodiment provides a design in which only two surfaces have optical power for the imaging lens 100 along the z-direction, the maximum clear aperture of the imaging lens 100 (here at surface F) is much larger, e.g., more than 50% greater, than the sensor image diagonal, i.e., a diagonal across the sensor image plane 134, and the maximum SAG of the imaging lens 100 (also at surface F) is relatively large, e.g., much greater than 100 μm. In the particular design illustrated in FIG. 1, the maximum clear aperture is 2.6 mm, the sensor image diagonal is 1.7 mm, and the maximum SAG is 203 μm.

However, having the maximum clear aperture being much larger than the sensor image diagonal and having a large maximum SAG may present manufacturability and cost issues, particularly when these optical elements are to be made on a wafer level, as described later. Without reference to a particular sensor, i.e., the sensor image diagonal, the maximum clear aperture may be defined relative to an image circle of the lens. In particular, the image circle of the lens is to be understood as the diameter of the image produced at the focal plane of the lens corresponding to a given field of view (FOV), e.g., 55 degrees or greater, of the lens. In the context of an imaging system having an imaging lens and an image sensor, the image circle is understood to be the largest distance across the image that is used by the image sensor, typically the image sensor diagonal of the sensor with which the imaging lens used or intended to be used.

Therefore, embodiments illustrated in FIGS. 2 to 5 may employ a two optical element design in which optical power is provided on three surfaces. Spreading the optical power over three surfaces, while increasing the number of surfaces to be manufactured, allows a maximum clear aperture much closer in size to the sensor image diagonal (or image circle) and a reduced SAG to be realized. In embodiments, the maximum clear aperture of the imaging lens may be less than 30% greater, e.g., less than 20% greater, than the sensor image diagonal or the image circle corresponding to a FOV of 55 degrees or greater.

Figure 2:
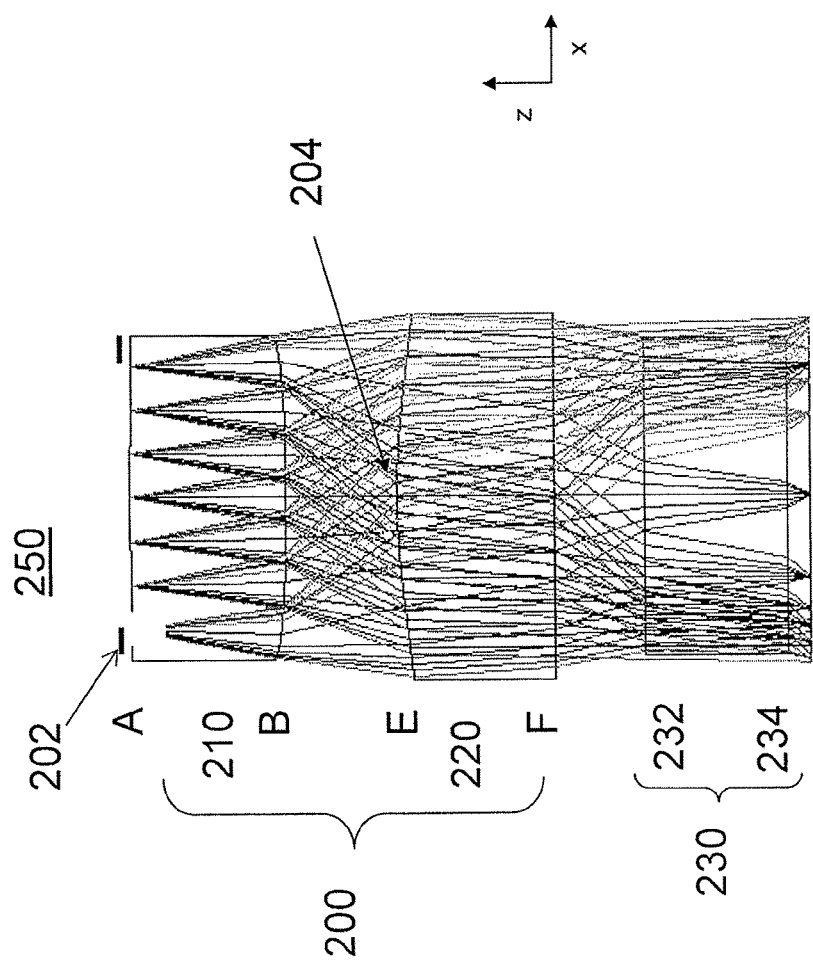
FIG. 2 illustrates a schematic side view of an imaging capturing system in accordance with an embodiment.

FIG. 2 illustrates a schematic side view of an imaging capturing system 250 in the LWIR waveband in accordance with an embodiment. As illustrated in FIG. 2, the image capturing system 250 includes an imaging lens 200 and a sensor 230.

The imaging lens 200 may include a first optical element 210 and a second optical element 220. In the schematic illustration of FIG. 2, a spacer (which would include surfaces C and D, see FIG. 6) provides an air gap between the first optical element 210 and the second optical element 220 has been omitted for clarity. Features outside the optical surfaces could be used to nest them together, e.g., the air gap may be provided by a barrel or housing.

In this particular embodiment, three surfaces, here surfaces A, B, and E, have optical power therein. One, two, or all three surfaces may be aspheric. All three surfaces may have a positive power at the apex thereof, i.e., may be convex at the apex thereof. The imaging lens 200 may also include the aperture stop 202, which may have the same configuration/properties noted above for aperture stop 102. The f-number for the imaging lens 200 may be less than 1.1.

If the material used for one or both optical elements 210, 220 presents chromatic dispersion over an operational waveband or if the imaging lens 200 otherwise requires correction, a diffractive element 204 may be provided on one or more of the surfaces A, B, E, or F. For example, the diffractive element 204 may be on the surface having the most optical power, here, surface E.

The sensor 230 may include a sensor cover glass 232 and pixels in a sensor image plane 234, the pixels detecting LWIR radiation. In the particular configuration, the sensor image diagonal may be about 1.443 mm.

Figure 3A:
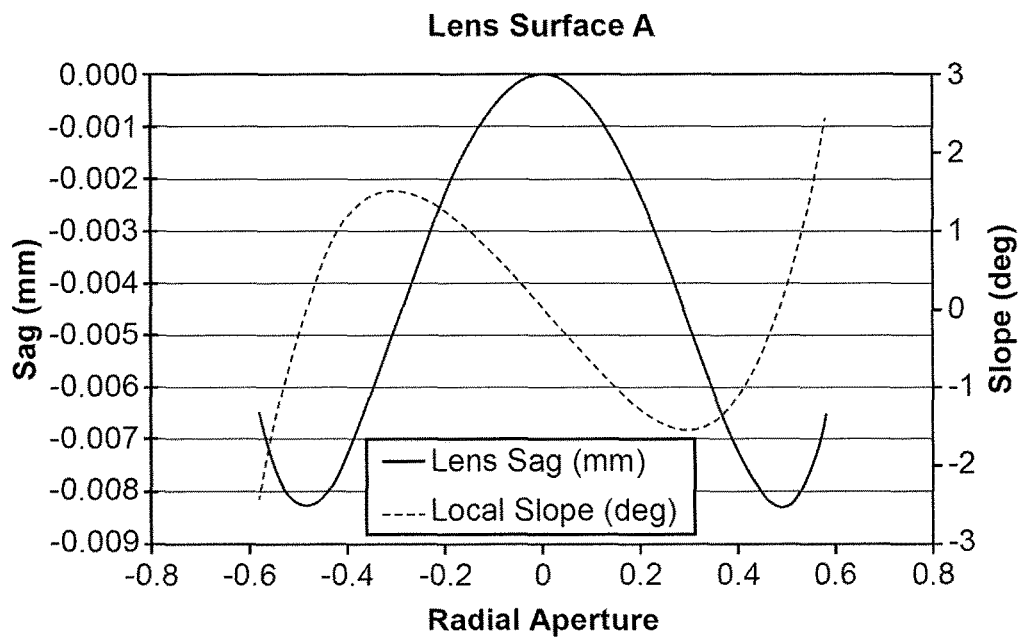
FIGS. 3A to 3C illustrate plots of lens sag and slope versus radial aperture for lens surfaces having power therein in FIG. 2.
Figure 3B:
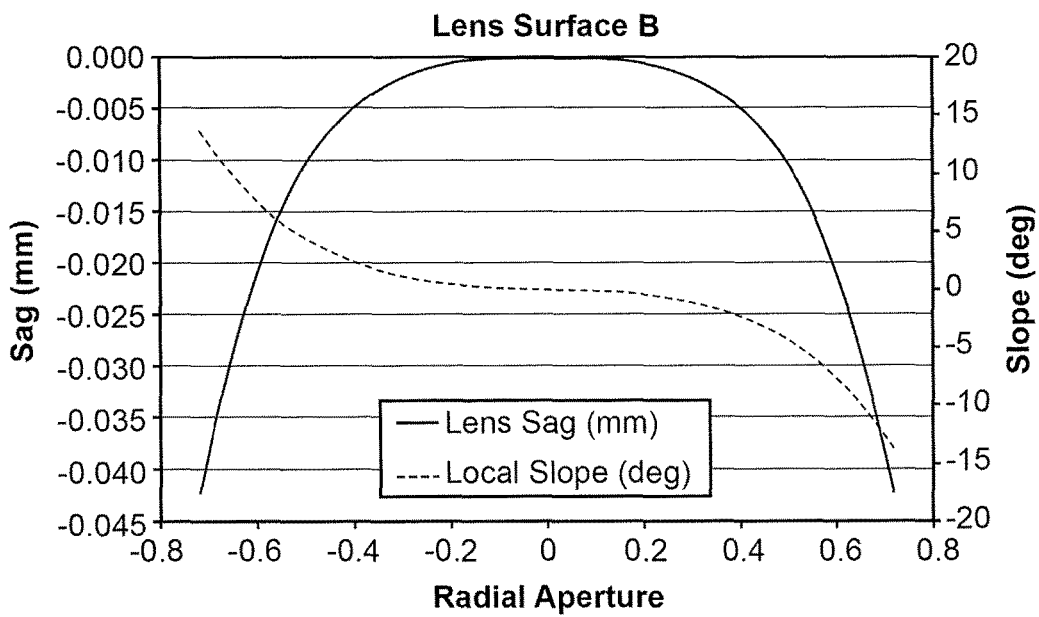
Figure 3C:
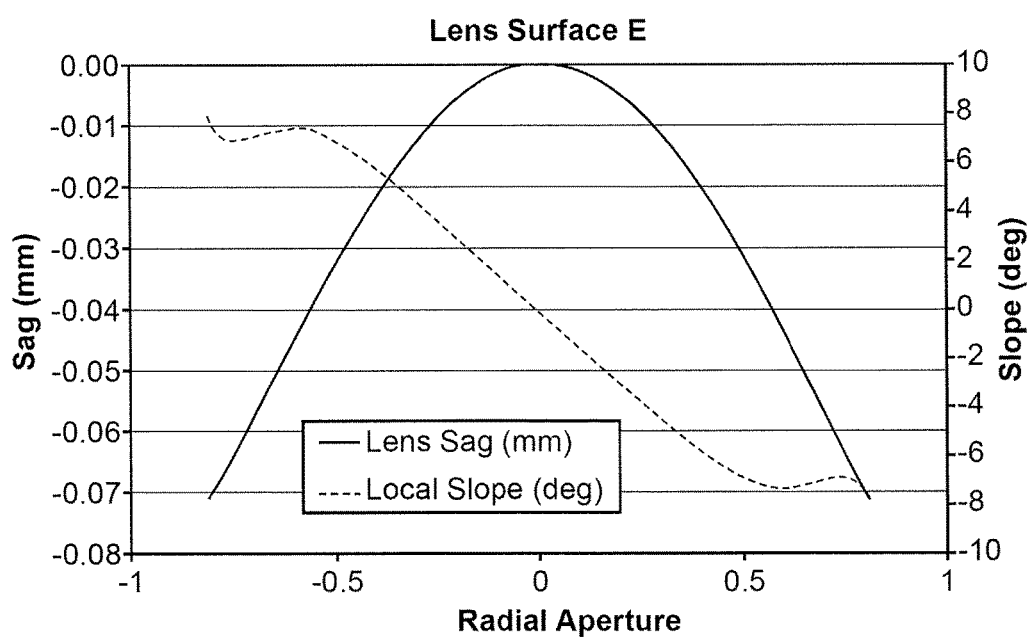

FIGS. 3A to 3C illustrate plots of lens sag and slope versus radial aperture for lens surfaces A, B, and E of FIG. 2.

As can be seen in FIG. 3A, surface A is a gullwing surface, i.e., has a convex apex and a concave edge. For surface A, the clear aperture is 1.159 mm and the SAG over the clear aperture is −0.008 mm (−8 μm).

As can be seen in FIG. 3B, surface B is a convex surface. For surface B, the clear aperture is 1.433 mm and the SAG over the clear aperture is 0.042 mm (42 μm).

As can be seen in FIG. 3C, surface E is a convex surface. For surface E, the clear aperture is 1.613 mm and the SAG over the clear aperture is 0.071 mm (71 μm).

Thus, for the imaging lens 200, the maximum clear aperture is 1.613 mm, i.e., less than 30% greater than the sensor image diagonal (or the image circle), and the maximum SAG is 71 μm, i.e., less than 100 μm.

Further, by having small SAGs, if a starting thickness, i.e., before forming the lens surface, of the optical elements 210, 220 is the same, then the center thickness of the optical elements 210, 220 may be within 15% of one another. In this particular example, the optical element 210 has a center thickness of 0.68 mm and the optical element 220 has a center thickness of 0.69 mm. For example, when made on a wafer level, a starting thickness of substrates used to create the optical elements 210, 220, may be between 0.5 mm and 1.5 mm, e.g., 0.5 mm to 1.0 mm, with this particular example having a starting thickness of 0.7 mm. Using the same or standard substrate thickness, particularly thinner substrates, may reduce cost.

Further, in this particular example, the second optical element 220 is closer to the cover glass 132 than to the first optical element 210, with a difference between these distances, i.e., B to E and F to 132, being less than 50%. In this particular example, the optical track length is 3 and a ratio of the optical track length to the image diagonal of the sensor is less than 2.5.

FIG. 4 illustrates a schematic side view of an imaging capturing system 350 in the LWIR waveband in accordance with an embodiment. As illustrated in FIG. 4, the image capturing system 350 includes an imaging lens 300 and the sensor 230.

The imaging lens 300 may include a first optical element 310 and a second optical element 320. In the schematic illustration of FIG. 4, a spacer (which would include surfaces C and D, see FIG. 6) between the first optical element 310 and the second optical element 320 has been omitted for clarity.

In this particular embodiment, three surfaces, here surfaces A, B, and E, have optical power therein. One, two, or all three surfaces may be aspheric The imaging lens 300 may also include the aperture stop 302, which may have the same configuration/properties noted above for aperture stop 102. The f-number for the imaging lens 300 may be less than 1.1.

If the material used for one or both optical elements 310, 320 presents chromatic dispersion over an operational waveband or if the imaging lens 300 otherwise requires correction, a diffractive element 304 may be provided on one or more of the surfaces A, B, E, or F. For example, the diffractive element 304 may be on the surface having the most optical power, here, surface E.

For the imaging lens 300, surface A is a gullwing surface having a clear aperture of 1.167 mm and SAG over the clear aperture of 0.017 mm (17 μm); surface B is a convex surface having a clear aperture of 1.398 mm and SAG over the clear aperture is 0.039 mm (39 μm); surface E is a gullwing surface having a clear aperture of 1.444 mm and SAG over the clear aperture is 0.046 mm (46 μm).

Thus, for the imaging lens 300, the maximum clear aperture is 1.444 mm, i.e., less than 30% greater than the sensor image diagonal (or the image circle), and the maximum SAG is 46 μm, i.e., less than 100 μm. Further, in this particular example, the second optical element 320 is closer to the cover glass 132 than to the first optical element 310, with a difference between these distances, i.e., B to E and F to 132, being greater than 50%.

FIG. 5 illustrates a schematic side view of an imaging capturing system 450 in the LWIR waveband in accordance with an embodiment. As illustrated in FIG. 5, the image capturing system 450 includes an imaging lens 400 and the sensor 130. The image capturing system 450 is designed for a longer optical track length than the embodiments of FIGS. 2 and 4, so the imaging lens 400 is of a slightly larger scale, with a thickness of the first optical element 410 being 1.019 mm and a thickness of the second optical element 420 being 1.488 mm.

The imaging lens 400 may include a first optical element 410 and a second optical element 420. In the schematic illustration of FIG. 5, a spacer (which would include surfaces C and D, see FIG. 6) between the first optical element 410 and the second optical element 420 has been omitted for clarity.

In this particular embodiment, three surfaces, here surfaces A, B, and E, have optical power therein. One, two, or all three surfaces may be aspheric. The imaging lens 400 may also include the aperture stop 402, which may have the same configuration/properties noted above for aperture stop 102. The f-number for the imaging lens 400 may be less than 1.1.

If the material used for one or both optical elements 410, 420 presents chromatic dispersion over an operational waveband or if the imaging lens 400 otherwise requires correction, a diffractive element 404 may be provided on one or more of the surfaces A, B, E, or F. For example, the diffractive element 404 may be on the surface having the most optical power, here, surface A.

For the imaging lens 400, surface A is a gullwing surface having a clear aperture of 1.423 mm and SAG over the clear aperture of 0.017 mm (17 μm); surface B is a convex surface having a clear aperture of 1.716 mm and SAG over the clear aperture is 0.049 mm (49 μm); surface E is a convex surface having a clear aperture of 1.750 mm and SAG over the clear aperture is 0.054 mm (54 μm).

Thus, for the imaging lens 400, the maximum clear aperture is 1.75 mm, i.e., less than 30% greater than the sensor image diagonal (or than the image circle), and the maximum SAG is 54 μm, i.e., less than 100 μm. Further, in this particular example, the second optical element 420 is closer to the cover glass 132 than to the first optical element 410, with a difference between these distances, i.e., B to E and F to 132, being greater than 50%.

Figure 6:
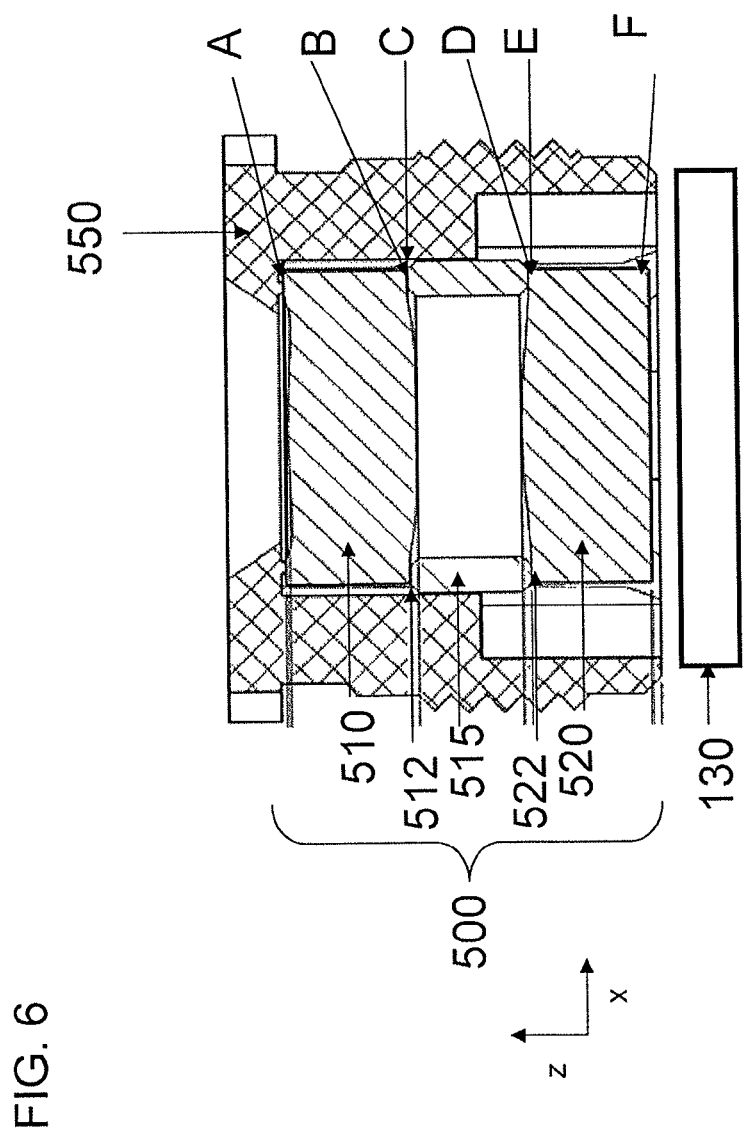
FIG. 6 illustrates a cross-sectional view of a module assembly including an imaging system in accordance with an embodiment.

Any of the imaging lenses 100, 200, 300, 400 discussed above may be provided in a barrel assembly 550, as illustrated in FIG. 6. In particular, the barrel assembly 550 may be a threaded barrel assembly such that a distance between an imaging lens 500 housed therein and the sensor 130, i.e., along the z-axis, may be altered. As illustrated therein, the imaging lens 500 may include a first optical element 510 and a second optical element 520 separated by a spacer 515 providing an air gap between surfaces B and E. The surfaces B and E may include relative planar portions 512, 522, i.e., flat regions, in a periphery thereof to facilitate securing of the spacer 515 thereto.

Embodiments described above may work with a particular image sensor diagonal of about 1.443 mm. This dimension may correspond to an exemplary sensor that includes a horizontal resolution of 60 pixels, a vertical resolution of 60 pixels and a pixel size or pixel pitch of approximately 17 μm. The teachings presented herein may be applied to imaging lens designs for use with sensors that include different image sensor diagonals. Certainly, as technology progresses, IR sensor sensitivity may increase and pixel sizes may decrease as exemplified by the reduction in size of visible image sensor pixels. Table I below lists some representative LWIR sensors currently available or currently under development and for which the embodiments provided herein may be designed.

TABLE I

Representative LWIR Image Sensor Specifications

| Horizontal Resolution (pix) | Vertical Resolution (pix) | Pixel Size (μm) | Image Diagonal (mm) |
|---|---|---|---|
| 320 | 240 | 25 | 10 |
| 320 | 240 | 17 | 6.8 |
| 320 | 240 | 10 | 4 |
| 160 | 120 | 25 | 5 |
| 160 | 120 | 17 | 3.4 |
| 160 | 120 | 10 | 2 |

TABLE I-continued

Representative LWIR Image Sensor Specifications

| Horizontal Resolution (pix) | Vertical Resolution (pix) | Pixel Size (μm) | Image Diagonal (mm) |
|---|---|---|---|
| 80 | 60 | 25 | 2.5 |
| 80 | 60 | 17 | 1.7 |
| 80 | 60 | 10 | 1 |
| 60 | 60 | 25 | 2.121 |
| 60 | 60 | 17 | 1.4425 |
| 60 | 60 | 10 | 0.8485 |

Figure 9:
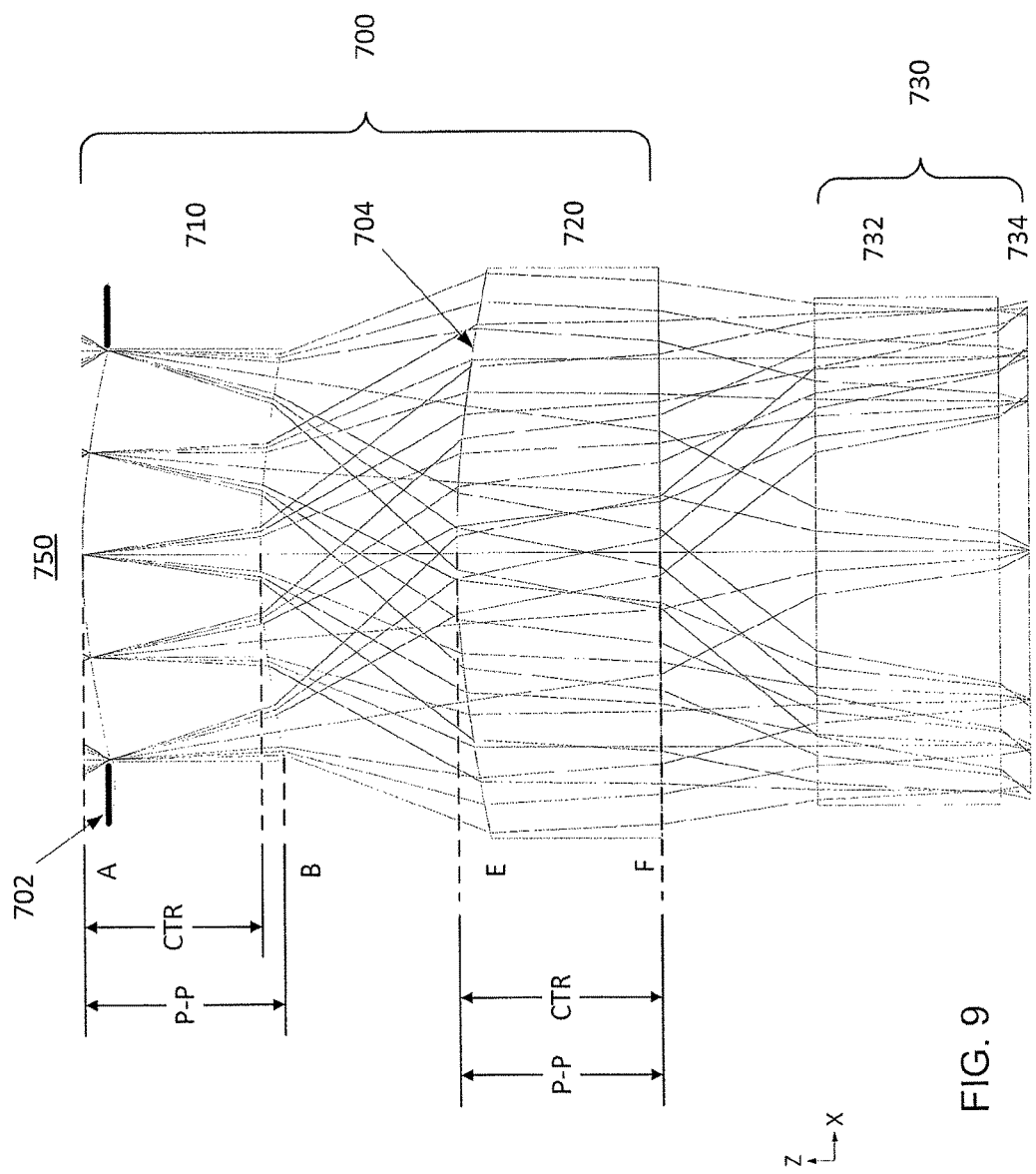
FIG. 9 illustrates a schematic side view of an image capturing system in accordance with an embodiment.

FIG. 9 illustrates a schematic side view of an imaging capturing system 750 in the LWIR waveband in accordance with an embodiment. As illustrated in FIG. 9, the image capturing system 750 includes an imaging lens 700 and the sensor 730. In this particular embodiment, the sensor 730 is characterized by a slightly larger image sensor diagonal of about 1.7 mm. Accordingly, the overall size of imaging lens 700 is slightly larger than imaging lenses 200, 300 and 400 described above.

The imaging lens 700 may include a first optical element 710 and a second optical element 720. In the schematic illustration of FIG. 9, a spacer (which would include surfaces C and D, see FIG. 6) between the first optical element 710 and the second optical element 720 has been omitted for clarity.

In this particular embodiment, three surfaces, here surfaces A, B, and E, have optical power therein. One, two, or all three surfaces may be aspheric. The imaging lens 700 may also include the aperture stop 702, which may have the same configuration/properties noted above for aperture stop 102. The f-number for the imaging lens 400 may be less than or about 1.1.

If the material used for one or both optical elements 710, 720 presents chromatic dispersion over an operational waveband or if the imaging lens 700 otherwise requires correction, a diffractive element 704 may be provided on one or more of the surfaces A, B, E, or F. For example, the diffractive element 704 may be on a surface having more optical power, for example surface A or surface E.

For the imaging lens 700, first optical element 710 includes a meniscus shape with the object side surface A being convex and the image side surface B being concave. Second optical element 720 includes a plano-convex shape with the object side surface E being convex and the image side surface F being planar. Surface A has positive power and surface B has negative power while the net effect of surfaces A and B combine to make optical element 710 positive overall. Surface E has positive power and optical element 720 is positive overall. Surface A includes a clear aperture of 1.395 mm and SAG over the clear aperture of 0.090 mm (90 μm). Surface B includes a clear aperture of 1.407 mm and SAG over the clear aperture is 0.077 mm (77 μm). Surface E includes a clear aperture of 1.950 mm and SAG over the clear aperture is 0.111 mm (111 μm). Thus, for the imaging lens 700, the maximum clear aperture is 1.95 mm, i.e., less than 30% greater than the sensor image diagonal (or than the image circle) of 1.7 mm, and the maximum SAG is 111 μm, which is slightly larger than 100 μm.

Notably, in each of the designs 200, 300, 400, 700, the largest sag corresponds to the same lens surface that includes the largest clear aperture. The ratio (or percentage) of largest sag to largest clear aperture of imaging lenses 200, 300, 400, and 700 may be calculated as 4.4%, 3.2%, 3.1%, and 5.7%, respectively. Thus, ratio of largest sag to largest clear aperture for all imaging lenses 200, 300, 400, and 700 is less than 10% and, in all instances, less than 6%. A relatively small ratio of the largest sag to largest clear aperture may be desirable in certain manufacturing methods, including those described in the "Method of Making" section below. Certainly smaller sags are desirable for many lens manufacturing techniques as it may limit the amount of material that is machined in masters or molds. However, there may be a practical lower limit on the ratio of largest sag to largest clear aperture as some amount of power might be desired in a given design.

Figure 10:
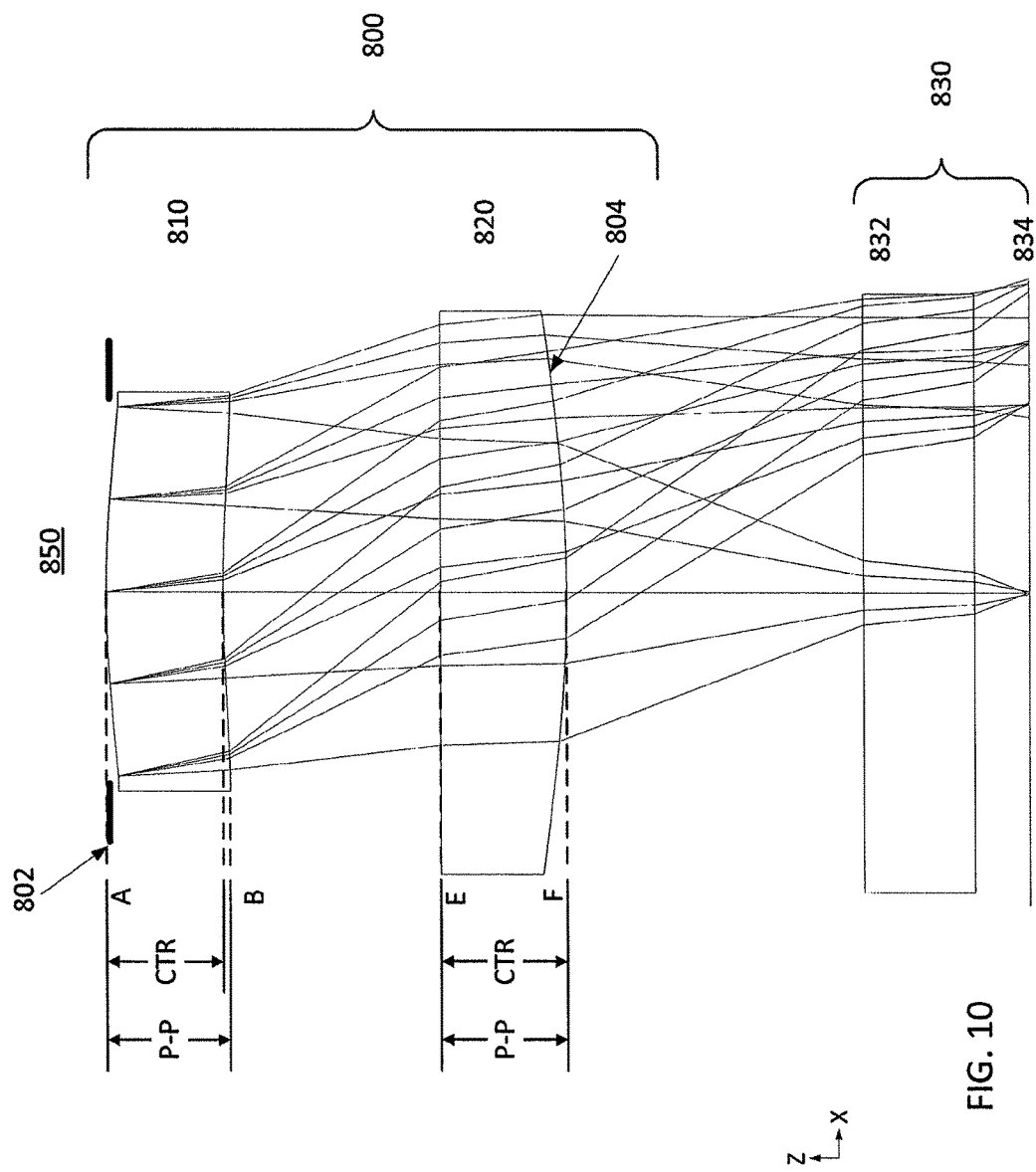
FIG. 10 illustrates a schematic side view of an image capturing system in accordance with an embodiment.

FIG. 10 illustrates a schematic side view of an imaging capturing system 850 in the LWIR waveband in accordance with an embodiment. As illustrated in FIG. 10, the image capturing system 850 includes an imaging lens 800 and the sensor 830. In this particular embodiment, the sensor 830 is characterized by an even larger image sensor diagonal of about 3.4 mm. Accordingly, the overall size of imaging lens 800 is slightly larger than imaging lenses 200, 300, 400 and 700 described above.

The imaging lens 800 may include a first optical element 810 and a second optical element 820. In the schematic illustration of FIG. 10, a spacer (which would include surfaces C and D, see FIG. 6) between the first optical element 810 and the second optical element 820 has been omitted for clarity.

In this particular embodiment, three surfaces, here surfaces A, B, and F, have optical power therein. One, two, or all three surfaces may be aspheric. The imaging lens 800 may also include the aperture stop 802, which may have the same configuration/properties noted above for aperture stop 802. The f-number for the imaging lens 400 may be less than or about 1.4.

If the material used for one or both optical elements 810, 820 presents chromatic dispersion over an operational waveband or if the imaging lens 800 otherwise requires correction, a diffractive element 804 may be provided on one or more of the surfaces A, B, E, or F. For example, the diffractive element 804 may be on a surface having more optical power, for example surface A or surface F.

For the imaging lens 800, first optical element 810 includes a meniscus shape with the object side surface A being convex and the image side surface B being concave. Second optical element 820 includes a plano-convex shape with the object side surface E being planar and the image side surface F being convex. Surface A has positive power and surface B has negative power while the net effect of surfaces A and B combine to make optical element 810 positive overall. Surface F has positive power and optical element 820 is positive overall. Surface A includes a clear aperture of 1.999 mm and SAG over the clear aperture of 0.062 mm (62 μm). Surface B includes a clear aperture of 2.161 mm and SAG over the clear aperture is 0.037 mm (37 μm). Surface F includes a clear aperture of 3.045 mm and SAG over the clear aperture is 0.130 mm (130 μm). Thus, for the imaging lens 800, the maximum clear aperture is 3.045 mm, i.e., less than 30% greater than the sensor image diagonal (or than the image circle) of 3.4 mm, and the maximum SAG is 130 μm, which is 4.3% (i.e., less than 6%) of the largest clear aperture. As with imaging lenses 200, 300, 400, and 700, the largest clear aperture is on one surface of a plano-convex element 820.

As discussed above, it may be desirable in the case of wafer-based manufacturing to make the center thicknesses of the optical elements similar in size. In one example given above, optical elements 210 and 220 in imaging lens 200 include center thicknesses of 0.68 mm and 0.69 mm, respectively. In that particular example and in the case of the imaging lens 300 of FIG. 4 (center thicknesses of about 0.71 mm for each element 310, 320), the center thickness along the optical axis represents the thickest portion of the element. However, in the case of optical elements that include concave surfaces, the center thickness may not represent the thickest region of the optical element nor the largest thickness dimension of the element.

Referring once again to FIGS. 9 and 10, each of these imaging lenses 700, 800 include a concave surface B. In these examples, the center thickness does not reflect the thickest (along a direction parallel to the optical axis) region of the element. In FIGS. 9 and 10, optical elements 710 and 810 include a center thickness dimension labeled "CTR" and a peak-to-peak dimension labeled "P-P." The P-P dimension reflects a largest distance parallel to the optical axis between the highest opposing surfaces of the elements 710, 810 within their respective clear apertures. In each case, the P-P dimension is larger than the CTR thickness dimension. Note, however that for optical elements 720, 820, the P-P dimension and CTR dimension are the same. Table II below includes relevant CTR and P-P dimensions for the imaging lenses 200, 300, 400, 700, 800 disclosed herein. Table II also includes a calculated percentage difference between the P-P thicknesses of the A-B element and the E-F element of each respective lens design.

TABLE II

Representative Optical Element Thicknesses

| Imaging Lens | A-B Element CTR Thickness | A-B Element P-P Thickness | E-F Element CTR Thickness | E-F Element P-P Thickness | P-P Difference Between Elements |
|---|---|---|---|---|---|
| 200 | 0.68 | 0.68 | 0.69 | 0.69 | 1% |
| 300 | 0.71 | 0.71 | 0.72 | 0.72 | 1% |
| 700 | 0.60 | 0.68 | 0.69 | 0.69 | 1% |
| 800 | 0.62 | 0.66 | 0.68 | 0.68 | 3% |

An advantage of wafer-based manufacturing techniques is that they may yield thinner optical elements than other methods. Further, the high index nature of the optical materials disclosed herein may permit smaller sags and shallower lens curves. One method of quantifying these characteristics is to compare (as a percentage) the sag of a particular powered surface of the imaging lens to the overall maximum (P-P) thickness of the optical element on which that powered surface lies. Another method compares (again as a percentage) the overall maximum (P-P) thickness of an optical element to the clear aperture size of a given powered surfaces on that particular element. Both of these quantities are shown in the table below for the same imaging lenses 200, 300, 700, 800 included in Table II. Specifically, Table III provides the following dimension ratios (represented as percentages):

Ratio A—The overall maximum (P-P) thickness of optical element A-B to the maximum clear aperture of surface A Ratio B—The overall maximum (P-P) thickness of optical element A-B to the maximum clear aperture of surface B Ratio C—The overall maximum (P-P) thickness of optical element A-B to the maximum clear aperture of surface E or F (whichever is powered)

Ratio D—Sag of surface A of the imaging lens to the overall maximum (P-P) thickness of optical element A-B Ratio E—Sag of surface B of the imaging lens to the overall maximum (P-P) thickness of optical element A-B Ratio F—Sag of surface E or F (whichever is powered) of the imaging lens to the overall maximum (P-P) thickness of optical element E-F

TABLE III

Representative Dimensions of Imaging Lenses

| Imaging Lens | Ratio A | Ratio B | Ratio C | Ratio D | Ratio E | Ratio F |
|---|---|---|---|---|---|---|
| 200 | 58.7% | 47.5% | 42.8% | 1.2% | 6.2% | 10.3% |
| 300 | 60.8% | 50.8% | 49.9% | 2.4% | 5.5% | 6.4% |
| 700 | 48.7% | 48.3% | 35.4% | 13.2% | 11.3% | 16.1% |
| 800 | 33.0% | 30.5% | 22.3% | 9.4% | 5.6% | 19.1% |

Notably, the numbers shown in the Ratio A, B, and C columns reveal that a significant advantage of wafer-based manufacturing techniques appears as image sensors (and hence, clear apertures) grow in size as in the case of imaging lenses 700 and 800. In those particular imaging lenses, the overall maximum P-P thickness of each of the optical elements in imaging lenses 700 and 800 is less than about 50% of the clear aperture size of the powered surfaces on those optical elements. And in the case of the larger of the two imaging lenses 800, that ratio is less than about 35% for all powered surfaces.

Another notable aspect of the ratios D, E, and F provided in Table III is that the ratio of sag of a particular powered surface of the imaging lens to the overall maximum (P-P) thickness of the optical element on which that powered surface lies is less than about 30%. More specifically, for the imaging lenses provided in Table III, this ratio is less than about 20%.

The tables below provide exemplary details on the depicted embodiments of imaging lenses 700, 800, and others. Table IV includes General Lens Data for imaging lens 700. Table V provides Surface Data for surfaces A, B, E, and F of imaging lens 700. Table VI provides details relating to aspheric coefficients of known even aspheric equations used to describe aspheric lens surfaces (e.g., surfaces A, B, E of imaging lens 700) and can be analyzed using available software such as ZEMAX or CODE V. Tables VII, VIII, and IX present similar data for imaging lens 800.

TABLE IV

General Lens Data For Imaging Lens 700

| | |
|---|---|
| Surfaces | 8 |
| Stop | 2 |
| System Aperture | Float By Stop Size = 0.6976 |
| Apodization | Uniform, factor = 0 |
| Temperature (C.) | 20 |
| Pressure (ATM) | 1 |
| Effective Focal Length | 1.6010 |
| Back Focal Length | 0.1971 |
| Total Track | 3.2047 |
| Image Space F/# | 1.1476 |
| Paraxial Working F/# | 1.1476 |
| Working F/# | 1.1009 |
| Image Space NA | 0.3994 |
| Stop Radius | 0.6976 |
| Paraxial Image Height | 0.8500 |
| Paraxial Magnification | 0.0000 |

TABLE IV-continued

General Lens Data For Imaging Lens 700

| | |
|---|---|
| Entrance Pupil Diameter | 1.3951 |
| Entrance Pupil Position | 0.0000 |
| Exit Pupil Diameter | 2.3749 |
| Exit Pupil Position | −2.6293 |
| Field Type | Real Image height in Millimeters |
| Maximum Radial Field | 0.85 |
| Primary Wavelength | 10.5 μm |
| Lens Units | Millimeters |
| Angular Magnification | 0.5875 |

TABLE V

Surface Data For Imaging Lens 700

| Surface | Type | Thickness | Material | Diameter | Conic | Note |
|---|---|---|---|---|---|---|
| OBJ | STANDARD | Infinity | | 0.000 | 0 | |
| 1 | STANDARD | 0.000 | | 1.543 | 0 | |
| STO | EVENASPH | 0.604 | SILICON | 1.395 | 0 | Surface A |
| 3 | EVENASPH | 0.659 | | 1.407 | 0 | Surface B |
| 4 | EVENASPH | 0.690 | SILICON | 1.950 | 0 | Surface E |
| 5 | EVENASPH | 0.526 | | 1.898 | 0 | Surface F |
| 6 | STANDARD | 0.50-0.75 | SILICON | 1.735 | 0 | Cover |
| 7 | STANDARD | 0.101 | | 1.693 | 0 | |
| IMA | STANDARD | | | 1.665 | 0 | |

TABLE VI

Asphere Coefficients For Elements 710 and 720 of Imaging Lens 700

Surface STO EVENASPH

| | |
|---|---|
| Coefficient on $r^2$ | 0.20792788 |
| Coefficient on $r^4$ | −0.10368648 |
| Coefficient on $r^6$ | 0.28308973 |
| Coefficient on $r^8$ | −0.35822562 |
| Coefficient on $r^{10}$ | −0.22014559 |
| Coefficient on $r^{12}$ | 0.52411507 |
| Coefficient on $r^{14}$ | 0 |
| Coefficient on $r^{16}$ | 0 |
| Aperture | Floating Aperture |
| Maximum radius | 0.69755287 |

Surface 3 EVENASPH

| | |
|---|---|
| Coefficient on $r^2$ | 0.20298147 |
| Coefficient on $r^4$ | −0.41026658 |
| Coefficient on $r^6$ | 2.9954506 |
| Coefficient on $r^8$ | −13.711652 |
| Coefficient on $r^{10}$ | 35.014635 |
| Coefficient on $r^{12}$ | −47.46132 |
| Coefficient on $r^{14}$ | 26.660403 |
| Coefficient on $r^{16}$ | 0 |

Surface 4 EVENASPH

| | |
|---|---|
| Coefficient on $r^2$ | 0.12748631 |
| Coefficient on $r^4$ | 0.065277268 |
| Coefficient on $r^6$ | −0.50553199 |
| Coefficient on $r^8$ | 1.477785 |
| Coefficient on $r^{10}$ | −2.2472389 |
| Coefficient on $r^{12}$ | 1.8033722 |
| Coefficient on $r^{14}$ | −0.71809312 |
| Coefficient on $r^{16}$ | 0.11408192 |

TABLE VII

General Lens Data For Imaging Lens 800

| | |
|---|---|
| Surfaces | 8 |
| Stop | 2 |
| System Aperture | Float By Stop Size = 0.999359 |
| Apodization | Uniform, factor = 0 |
| Temperature (C.) | 20 |
| Pressure (ATM) | 1 |
| Effective Focal Length | 2.8243 |
| Back Focal Length | 0.4205 |
| Total Track | 4.9353 |
| Image Space F/# | 1.4131 |
| Paraxial Working F/# | 1.4131 |
| Working F/# | 1.3843 |
| Image Space NA | 0.3336 |
| Stop radius | 0.9994 |
| Paraxial Image Height | 1.7000 |
| Paraxial Magnification | 0.0000 |
| Entrance Pupil Diameter | 1.9987 |
| Entrance Pupil Position | 0.0000 |
| Exit Pupil Diameter | 3.5495 |
| Exit Pupil Position | −4.8951 |
| Field Type | Real Image height in Millimeters |
| Maximum Radial Field | 1.7 |
| Primary Wavelength | 10.5 μm |
| Lens Units | Millimeters |
| Angular Magnification | 0.5631053 |

TABLE VIII

Surface Data For Imaging Lens 800

| Surface | Type | Thickness | Material | Diameter | Conic | Note |
|---|---|---|---|---|---|---|
| OBJ | STANDARD | Infinity | | 0.000 | 0 | |
| 1 | STANDARD | 0.000 | | 2.121 | 0 | |
| STO | EVENASPH | 0.624 | SILICON | 1.999 | 0 | Surface A |
| 3 | EVENASPH | 1.143 | | 2.161 | 0 | Surface B |
| 4 | EVENASPH | 0.680 | SILICON | 2.937 | 0 | Surface E |
| 5 | EVENASPH | 1.588 | | 3.045 | 0 | Surface F |
| 6 | STANDARD | 0.50-0.7 | SILICON | 3.166 | 0 | Cover |
| 7 | STANDARD | 0.300 | | 3.235 | 0 | |
| IMA | STANDARD | | | 3.379 | 0 | |

TABLE IX

Asphere Coefficients For Elements 810 and 820 of Imaging Lens 800

Surface STO EVENASPH

| | |
|---|---|
| Coefficient on $r^2$ | 0.078891323 |
| Coefficient on $r^4$ | −0.012321811 |
| Coefficient on $r^6$ | −0.004856381 |
| Coefficient on $r^8$ | −0.000119317 |
| Coefficient on $r^{10}$ | 0.000200377 |
| Coefficient on $r^{12}$ | 0 |
| Coefficient on $r^{14}$ | 0 |
| Coefficient on $r^{16}$ | 0 |
| Aperture | Floating Aperture |
| Maximum radius | 0.99935902 |

Surface 3 EVENASPH

| | |
|---|---|
| Coefficient on $r^2$ | 0.058798864 |
| Coefficient on $r^4$ | −0.021036329 |
| Coefficient on $r^6$ | −0.008045456 |
| Coefficient on $r^8$ | 0.016800284 |
| Coefficient on $r^{10}$ | −0.009958394 |
| Coefficient on $r^{12}$ | 0 |
| Coefficient on $r^{14}$ | 0 |
| Coefficient on $r^{16}$ | 0 |

TABLE IX-continued

Asphere Coefficients For Elements
810 and 820 of Imaging Lens 800

Surface 5 EVENASPH

| | |
|---|---|
| Coefficient on r^2 | −0.063406934 |
| Coefficient on r^4 | 0.002492598 |
| Coefficient on r^6 | 0.000466197 |
| Coefficient on r^8 | −0.00020842 |
| Coefficient on r^10 | 6.15E−05 |
| Coefficient on r^12 | 0 |
| Coefficient on r^14 | 0 |
| Coefficient on r^16 | 0 |

Method of Making

One or both of optical elements noted above may be silicon. Any one, two, or all of the lens surfaces noted above may be made using, e.g., the stamp and transfer technique disclosed in U.S. Pat. No. 6,027,595, which is hereby incorporated by reference in its entirety. As noted therein, these surfaces may be created on the wafer level, i.e., a plurality of these surfaces may be replicated and transferred to a wafer simultaneously and later singulated to realize individual optical elements. Depending on the material of the optical element, other techniques for forming one or more of the lens surfaces may include diamond turning or molding, e.g., high temperature molding.

In addition to fabrication of surfaces on a wafer level, as disclosed in U.S. Pat. No. 6,096,155, which is hereby incorporated by reference in its entirety, two or more wafers, each having a plurality of optical elements thereon may be secured together along the z-direction before singulation, such that individual optical systems each have an optical element from each wafer. A spacer wafer may be provided between the two wafers having the optical elements thereon. Alternatively, one of the wafers having optical elements thereon and the spacer wafer may be secured and singulated, and then secured to another wafer having optical elements thereon, or one of the wafers having optical elements thereon may have spacers die bonded thereon and then secured to the other wafer having optical elements thereon.

In some embodiments, optical elements may be configured for use with LWIR image sensors that are sensitive to wavelengths outside of the operational LWIR band. For example, certain LWIR image sensors might also detect energy in adjacent MWIR or SWIR wavelength bands. In some instances, improved imaging performance in the LWIR operational band may be achieved if one or more surfaces in the imaging lens include filter coatings, anti-reflection coatings, and the like. For example, certain surfaces of the optical elements that are planar (e.g., not molded or etched) may be easily processed with optical coatings. Certainly, filtering and anti-reflection coatings may be applied and may be desirable on powered surfaces as well.

Devices Incorporating LWIR Imaging Lens

FIG. 7 illustrates a perspective view of a computer 680 having an LWIR imaging system 600 integrated therein. FIG. 8 illustrates a front and side view of a mobile telephone 690 having the LWIR imaging system 600 integrated therein. Of course, the LWIR imaging system 600 may be integrated at other locations and with other electronic devices, e.g., mobile devices, entertainment systems, stand-alone thermal imagers, and so forth, other than those shown. The LWIR imaging system 600 may be any of those noted above.

As used herein, the term "and/or" includes any and all combinations of one or more of the associated listed items.

Further, although terms such as "first," "second," "third," etc., may be used herein to describe various elements, components, regions, layers and/or sections, these elements, components, regions, layers and/or sections should not be limited by these terms. These terms are only used to distinguish one element, component, region, layer and/or section from another. Thus, a first element, component, region, layer and/or section could be termed a second element, component, region, layer and/or section without departing from the teachings of the embodiments described herein.

Spatially relative terms, such as "beneath," "below," "lower," "above," "upper," etc., may be used herein for ease of description to describe the relationship of one element or feature to another element(s) or feature(s), as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

As used herein, the singular forms "a," "an" and "the" are intended to include the plural forms as well, unless the context clearly indicates otherwise. It will be further understood that the terms "comprises," "comprising," "includes," and "including" specify the presence of stated features, integers, steps, operations, elements, components, etc., but do not preclude the presence or addition thereto of one or more other features, integers, steps, operations, elements, components, groups, etc.

Embodiments of the present invention have been disclosed herein and, although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the present invention as set forth in the following claims.

What is claimed is:

1. An imaging lens for use with an operational waveband over any subset of 7.5-13.5 μm, the imaging lens comprising:
   a first optical element of a first high-index material, the first optical element having an object side surface and an image side surface and a first maximum peak to peak thickness between the object and image side surfaces; and
   a second optical element of a second high-index material, the second optical element having an object side surface and an image side surface and a second maximum peak to peak thickness between the object and image side surfaces, the object side surface of the second optical element facing the image side surface of the first optical element, wherein maximum peak to peak thicknesses of all optical elements in the imaging lens are within 3 percent of each other, and the first and second high-index materials having a refractive index greater than 2.2 in the operational waveband, an absorption per mm of thickness less than 75% in the operational waveband, and an absorption per mm of thickness greater than 75% in a visible waveband of 400-650 nm.

2. The imaging lens as claimed in claim 1, wherein the first optical element includes a meniscus shape, with the object side surface of the first optical element being convex and the image side surface of the first optical element being concave.

3. The imaging lens as claimed in claim 1, wherein the object side surface and image side surface of the first optical element are each convex near the optical axis.

4. The imaging lens as claimed in claim 1, wherein the maximum peak to peak thicknesses of the first and second optical elements are each greater than 500 microns and less than 1500 microns.

5. The imaging lens as claimed in claim 1, wherein at least one of the first and second high-index materials is silicon.

6. The imaging lens as claimed in claim 1, wherein the second optical element is plano-convex.

* * * * *